(12) United States Patent
Nabekura

(10) Patent No.: US 7,707,375 B2
(45) Date of Patent: Apr. 27, 2010

(54) STORAGE SYSTEM AND CONTROLLER FOR CONTROLLING REMOTE COPYING

(75) Inventor: Yukoh Nabekura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 517 days.

(21) Appl. No.: 11/648,557

(22) Filed: Jan. 3, 2007

(65) Prior Publication Data
US 2008/0109620 A1 May 8, 2008

(30) Foreign Application Priority Data
Nov. 8, 2006 (JP) .............................. 2006-302424

(51) Int. Cl.
*G06F 12/00* (2006.01)
(52) U.S. Cl. .................. 711/162; 711/156; 711/167
(58) Field of Classification Search ............... 711/162, 711/161, 170; 714/6, 5, 4; 707/204
See application file for complete search history.

(56) References Cited

U.S. PATENT DOCUMENTS

| 7,046,261 | B2 | 5/2006 | Popp et al. |
| 7,330,997 | B1 * | 2/2008 | Odom ........................... 714/6 |
| 7,461,102 | B2 * | 12/2008 | Derk et al. .................. 707/204 |
| 2004/0148485 | A1 * | 7/2004 | Suzuki ....................... 711/170 |
| 2005/0216688 | A1 | 9/2005 | Watanabe |
| 2006/0190505 | A1 * | 8/2006 | DeMaio et al. ............. 707/204 |

FOREIGN PATENT DOCUMENTS

| JP | 2003-15933 | 7/2001 |
| JP | 2003-345523 | 5/2002 |
| JP | 2005-275537 | 3/2004 |
| JP | 2006-039976 | 7/2004 |

* cited by examiner

*Primary Examiner*—Pierre-Michel Bataille
(74) *Attorney, Agent, or Firm*—Foley & Lardner LLP

(57) ABSTRACT

The reconfiguration controller selects for each data whether or not to execute remote copying of data from the first storage device to the second storage device. Each data sent from the host to be stored in the first storage device contains a copy policy tag that defines the policy relating to remote copying. The reconfiguration controller determines whether or not remote copying of the each data is necessary based on the copy policy tag of the each data, and selectively transmits the data requiring remote copying to the second storage device.

14 Claims, 11 Drawing Sheets

FIG. 11

| RECORD IDENTIFYCATION | TIME STAMP | DATA IDENTIFYCATION | DATA GROUP IDENTIFYCATION | KEY 1 | KEY 2 | KEY 3 | KEY 4 | KEY 5 | COPY NECESSARY OR NOT |
|---|---|---|---|---|---|---|---|---|---|
| 0 | 0"00 | DATA #1 | GROUP #1 | NECESSARY | NOT | 10 | 1 | YES | NECESSARY →NOT |
| 1 | 0"01 | DATA #2 | GROUP #1 | NOT | NOT | 5 | 1 | NO | NECESSARY →NOT |
| 2 | 1"05 | DATA #3 | GROUP #2 | NECESSARY | NOT | 20 | 1 | NO | NECESSARY →NECESSARY |
| 3 | 5"02 | DATA #4 | GROUP #2 | NECESSARY | NOT | 20 | 1 | NO | NECESSARY →NECESSARY |
| 4 | 0 | UNUSED | UNUSED | 0 | 0 | 0 | 0 | 0 | NECESSARY →? |
| 5 | 0 | UNUSED | UNUSED | 0 | 0 | 0 | 0 | 0 | NECESSARY →? |
| 6 | 0 | UNUSED | UNUSED | 0 | 0 | 0 | 0 | 0 | NECESSARY →? |
| 7 | 0 | UNUSED | UNUSED | 0 | 0 | 0 | 0 | 0 | NECESSARY →? |
| 8 | 0 | UNUSED | UNUSED | 0 | 0 | 0 | 0 | 0 | NECESSARY →? |
| 9 | 0 | UNUSED | UNUSED | 0 | 0 | 0 | 0 | 0 | NECESSARY →? |
| 10 | 0 | UNUSED | UNUSED | 0 | 0 | 0 | 0 | 0 | NECESSARY →? |
| 11 | 0 | UNUSED | UNUSED | 0 | 0 | 0 | 0 | 0 | NECESSARY →? |
| 12 | 0 | UNUSED | UNUSED | 0 | 0 | 0 | 0 | 0 | NECESSARY →? |
| 13 | 0 | UNUSED | UNUSED | 0 | 0 | 0 | 0 | 0 | NECESSARY →? |
| 14 | 0 | UNUSED | UNUSED | 0 | 0 | 0 | 0 | 0 | NECESSARY →? |
| 15 | 0 | UNUSED | UNUSED | 0 | 0 | 0 | 0 | 0 | NECESSARY →? |

230

STORAGE SYSTEM AND CONTROLLER FOR CONTROLLING REMOTE COPYING

CROSS-REFERENCE TO RELATED APPLICATIONS

This application relates to and claims priority from Japanese Patent Application No. 2006-302424 filed on Nov. 8, 2006, the entire disclosure of which is incorporated herein by reference.

FIELD OF THE INVENTION

The present invention relates to a storage system in which remote copying of data can be executed between a plurality of storage devices, and to a controller for controlling remote copying.

DESCRIPTION OF THE RELATED ART

Copying data between a plurality of storage devices that are in differing sites is called "remote copying" of data in this Description. Technology for remote copying has been disclosed in Japan Patent Application Laid-open No. 2005-275537, Japan Patent Application Laid-open No. 2006-39976, and Japan Patent Application Laid-open No. 2003-345523. According to this kind of prior art, when a given volume within in a first storage device has been selected as the target for remote copying, all of the data within the selected volume is copied from the first storage device to the second storage device.

Japan Patent Application Laid-open No. 2003-15933 discloses that, in order to reduce the amount of data targeted for remote copying, the storage device that receives data from the host has a table that defines files and directories, and whether or not to remotely copy data from the host is selected for every file or directory by referring to that table.

The prior art disclosed in Japan Patent Application Laid-open No. 2005-275537, Japan Patent Application Laid-open No. 2006-39976, and Japan Patent Application Laid-open No. 2003-345523, which copy from a first storage device to a second storage device all data within a volume selected as a target for copying, is established from the perspective of emphasizing data agreement or data guarantee between both storage devices. However, data agreement or data guarantee between both storage devices is not always emphasized from a practical point of view. Actually, there are users for whom the guarantee of all data is not always necessary, and who would be satisfied with the selective remote copying of just specified data.

If data that does not need to be copied is nonetheless updated to a volume selected as the copy target, then the resources and processing times of both storage devices are wasted when copying that update data. Moreover, a great number of copy data transmit processing is concentrated in the second storage device, a situation is produced in which the transmission processing of copying data from the first storage device must be controlled, and the processing performance of the entire system is diminished thereby.

SUMMARY OF THE INVENTION

An object of the present invention is to be able to select whether or not to conduct remote copying for each data.

Another object is to reduce the resource or processing load when remotely copying with a plurality of storage devices.

The principle of the present invention is to add to all data a tag that defines a policy relating to remote copying, and to select data targeted for remote copying based on that tag.

The storage system following one aspect of the present invention comprises a first storage device that receives and stores at least one data set from a host, and a second storage device that receives and stores the at least one data set transmitted from of the first storage device, and is configured such that remote copying of the data set stored in the first storage device to the second storage device becomes possible.

The each data set stored in the first storage device has a copy policy tag that defines the policy relating to remote copying of the data set. This storage system further comprises a reconfiguration controller that selects whether or not to transmit the data set stored in the first storage device to the second storage device based on the copy policy tag of the data set stored in the first storage device.

The reconfiguration controller can be built into the first storage device. Or, the reconfiguration controller may be outside of the first storage device and second storage device. In the latter case, the reconfiguration controller receives the data set that is stored in the first storage device from the first storage device, and selects whether or not to transmit the data set received from the first storage device to the second storage device based on the copy policy tag of the data set received from the first storage device.

The copy policy tag of the each data set can comprise an element that designates whether or not the data set is remote copy enabled. Then, the reconfiguration controller may selectively transmit to the second storage device the data set having the copy policy tag that designates remote copy enabled.

The copy policy tag of the data set can comprise an element that designates conditions necessary for remote copying of the data set. Then, the reconfiguration controller determines whether or not the data set fulfills the conditions designated by the copy policy tag, and can selectively transmit to the second storage device the data set that fulfills the conditions.

The conditions can include an access counter set value. In that case, the reconfiguration controller detects the access frequency of the each data set, compares the detected access frequency with the set value designated by the copy policy tag of the data set, and determines whether or not the conditions are fulfilled.

The copy policy tag of the each data set can comprise an element that designates whether or not the data set can be overwritten. Then, (A) when attempting to transmit to the second storage device current data having the copy policy tag designating overwrite enabled, and if update data to the current data is received prior to transmitting the current data to the second storage device, the reconfiguration controller may transmit the update data to the second storage device without transmitting the current data to the second storage device, and (B) when attempting to transmit to the second storage device current data having the copy policy tag designating overwrite disabled, and if update data to the current data is received prior to transmitting the current data to the second storage device, the reconfiguration controller may transmit the update data to the second storage device after the current data is transmitted to the second storage device.

The copy policy tag of the each data set can comprise an element that designates whether or not a transmission designation command input from a user is valid. Then, if the transmission designation command is input from the user, the reconfiguration controller may selectively transmit to the second storage device the data set having the copy policy tag designating that the transmission designation command is valid.

The first storage device checks whether or not the reconfiguration controller is in the busy state, and if the reconfiguration controller is in the busy state, the first storage device can transmit, among the data sets stored in the first storage device, the data set that has not yet been handled by the reconfiguration controller directly to the second storage device without passing through the reconfiguration controller.

The reconfiguration controller checks whether or not the copy policy tags disagree between a plurality of data sets belonging to the same data group among the data sets stored in the first storage device, and if disagreements of the copy policy tags are detected, the same processing relating to whether or not to transmit to the second storage device can be applied to all of the plurality of data sets belonging to the same data group.

In addition to the configuration described above, the storage system of the present invention may further comprise a policy tagger that attaches the copy policy tag to each data set stored in the first storage device. The policy tagger can be provided in the host. Or, the policy tagger can be provided in the first storage device.

The policy tagger can attach copy policy tags of the same content to all of the plurality of data sets belonging to the same data group.

Following another aspect of the present invention, in a storage system comprising a first and second storage device, a controller is provided for controlling remote copying of data sets stored in the first storage device to the second storage device. Each data set stored in the first storage device has a copy policy tag that defines the policy relating to the remote copying of the data set. Then, the controller selects whether or not to transmit the data set stored in the first storage device to the second storage device based on the copy policy tag of the data set stored in the first storage device.

Following yet another aspect of the present invention, provided is a method for controlling remote copying of data sets stored in a first storage device to a second storage device in a storage system comprising the first and second storage device, the method comprising the step of attaching to the each data set stored in the first storage device a copy policy tag that defines the policy relating to the remote copying of the data set, and the step of the controller selecting whether or not to transmit data set stored in the first storage device to the second storage device based on the copy policy tag of the data set stored in the first storage device.

BRIEF DESCRIPTION OF THE DRAWINGS

FIG. 11 is a diagram indicating a concrete example of a remote copying control table.

DESCRIPTION OF THE PREFERRED EMBODIMENTS

Embodiments of the present invention will be explained below while referring to the diagrams.

Figure 1:
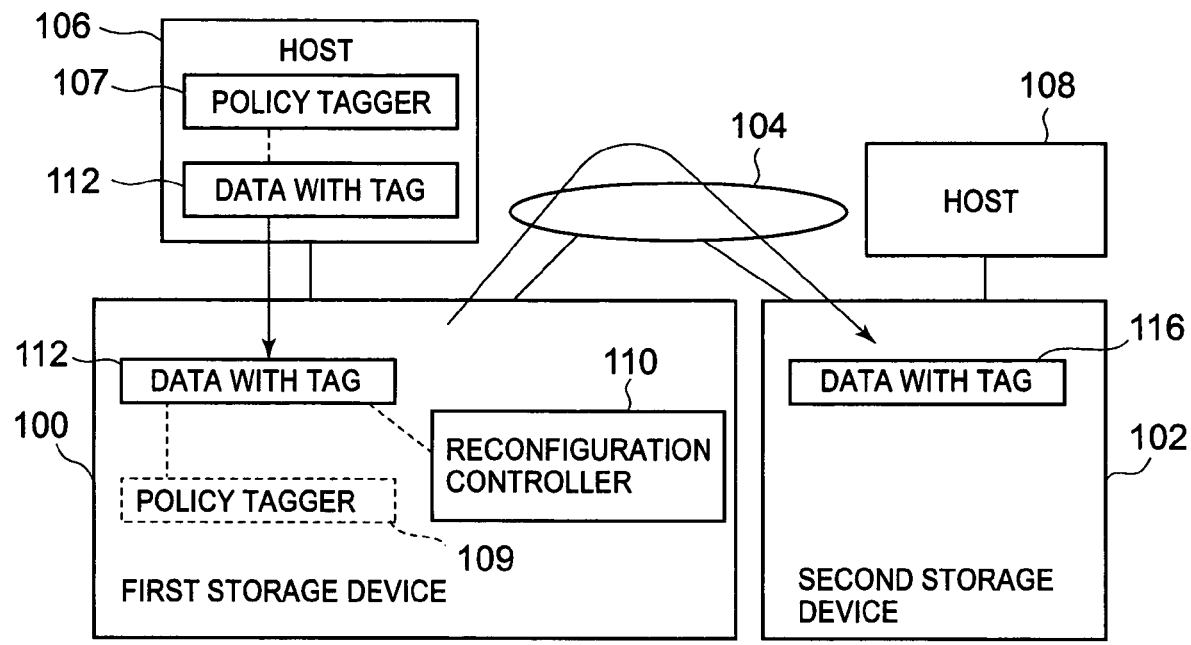
FIG. 1 is a block diagram indicating the configuration of a storage system related to one embodiment of the present invention.

FIG. 1 is the configuration of a storage system related to one embodiment of the present invention.

As indicated in FIG. 1, a first storage device 100 and a second storage device 102 are set up in distinct locations, and the two mutually communicate through a communications circuit or communications network 104. A host 106 is connected to the first storage device 100. A separate host 108 may be connected to the second storage device 102. The explanation below focuses on the control of remote copying when the first storage device 100 receives from the host 106 a write request and data to be written, stores the received data in the first storage device 100, and transfers a backup copy or replica of the received data the second storage device 102 which stores the backup copy or replica of the data. The explanation of the control when the host 106 reads data from the first storage device 102 will be omitted.

When all of the data that the host 106 requests to be written to the first storage device 100 is transmitted to the second storage device 102, although all of the data can be guaranteed, if the processing capacity of the second storage device 102 is particularly low, the processing of the first storage device 100 will be affected in that the first storage device 100 will have to wait. In practical terms, the user does not always need all of the data to be guaranteed. In the storage system related to this embodiment, tags that define the policy relating to remote copying are attached to the data, and data targeted for remote copying are selected based on these tags.

The host 106 has a policy tagger 107, and the policy tagger 107 can be implemented by a computer program, a routed logical circuit or a combination of these. When data to be written to the first storage device 100 is generated in the host 106, the policy tagger 107 attaches to the data a copy policy tag that defines the detailed conditions or policy regarding whether or not to remotely copy that data. Consequently, the data sent in conjunction with the write request from the host 106 to the first storage device is data 112 with a tag. The content of the copy policy tag attached to the data 112 by the policy tagger 107 can be set by the system user. A concrete example of the content of a copy policy tag will be described later.

When the write request and the data 112 to be written are received from the host 106, the first storage device 100 stores that data 112 at the address designated by the write request within a storage region in the first storage device 100. The first storage device 100 has the reconfiguration controller 110, and the reconfiguration controller 110 can be implemented by a computer program, a routing logical circuit or a combination of these. When a request is made from the host 106 to write the data 112 to the first storage device 100, the reconfiguration controller 110 controls whether or not to remotely copy the data 112 from the first storage device 100 to the second storage device 102 by following the copy policy tags attached to that data 112. By controlling the remote copying that the reconfiguration controller 110 executes, a database is reconfigured within the second storage device 102 that has a form different than the database configured in the first storage device 100. Stated more concretely, the reconfiguration controller 110 determines whether or not it is necessary to execute remote copying of the data 112 based on the copy policy tag attached to the data 112, for which the host 106 has made a write request. If determined that remote copying of a given data 112 is necessary, the reconfiguration controller 110 generates a duplicate data 116 of that data 112, and transmits that duplicate together with the write request to the second storage device 102 (specifically, executes remote copying). On the other hand, if determined that remote copying of a given data 112 is not necessary, the reconfiguration controller 110 does not transmit that data 112 to the second storage device 102 (specifically, does not execute remote copying). Consequently, not all of the data written in the first storage device 100, but only the part of the data selected by the reconfiguration controller 110 is remotely copied to the second storage device 102. Here, as a method for reconfiguration controller 110 to control the processing order of a large quantity of data 112 received from the host 106, for example, a method such as a wrap around system can be adopted in which old data is processed first based on time stamps following the ascending order of respectively time stamped data. The operation of the data 112 being remotely copied from the first storage device 100 to the second storage device 102, and the operation of storing that data 112 in a storage region of the first storage device 100 may be executed asynchronously, for example, executing the former operation after the latter operation. By remotely copying only the data sorted and selected by the reconfiguration controller 110, the resources of the second storage device 102 are economized, and the processing load is reduced. This reduces the possibility of the processing capacity of the second storage device 102 affecting the first storage device 100 when backing up or mirroring data.

As indicated by the dotted line in FIG. 1, a policy tagger 109 may be set up in the first storage device 100. The policy tagger 109 in the first storage device 100 can attach copy policy tags to the data received from the host 106. For example, if copy policy tags are not attached to the data received from the host 106, the policy tagger 109 attaches copy policy tags to that data. Or, if the copy policy tags attached to the data 112 received from the host 106 are not suitable, the policy tagger 109 can correct the unsuitable copy policy tags of that data 112 to proper ones.

Figure 2:
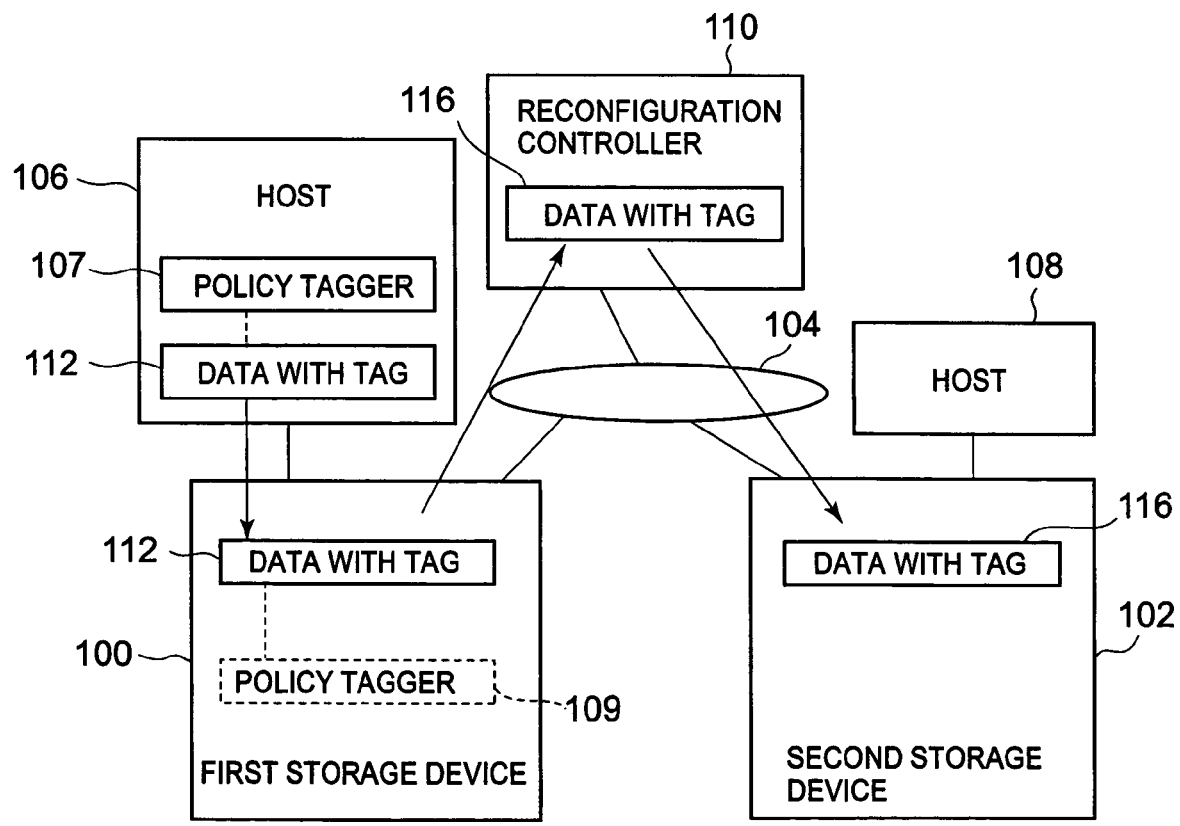
FIG. 2 is a block diagram indicating the configuration of a storage system related to a variation.

FIG. 2 is a variant of the storage system indicated in FIG. 1.

As indicated in FIG. 2, the reconfiguration controller 110 is set up as an independent device outside of the first and second storage devices 100 and 102. This independent reconfiguration controller 110 can communicate with the first and second storage devices 100 and 102 through a communications line or the communications network 104. When receiving from the host 106 the write request together with data 112 to be written, the first storage device 100 stores that data 112 in a storage region within the first storage device 100, generates data 116, which is a duplicate data 112, and transmits the data 116 to the reconfiguration controller 110. The reconfiguration controller 110 controls whether or not to execute remote copying of the data 116 from the first storage device 100 to the second storage device 102 in the same manner as the reconfiguration controller 110 indicated in FIG. 1.

When the reconfiguration controller 110 is built into the first storage device 100 as indicated in FIG. 1, there is the advantage that the reconfiguration controller 110 can utilize the first storage device 100 resources. On the other hand, if the reconfiguration controller 110 is an independent device arranged outside of the first and second storage devices 100 and 102 as shown in FIG. 2, there are the advantages that the processing capacity of the reconfiguration controller 110 can be easily heightened without affecting the processing capacities of the first and second storage devices 100 and 102, and that a plurality of storage devices can jointly use one reconfiguration controller 110.

As another variation not indicated in the diagrams, the reconfiguration controller 110 may be set up inside the second storage device 102.

Figure 3:
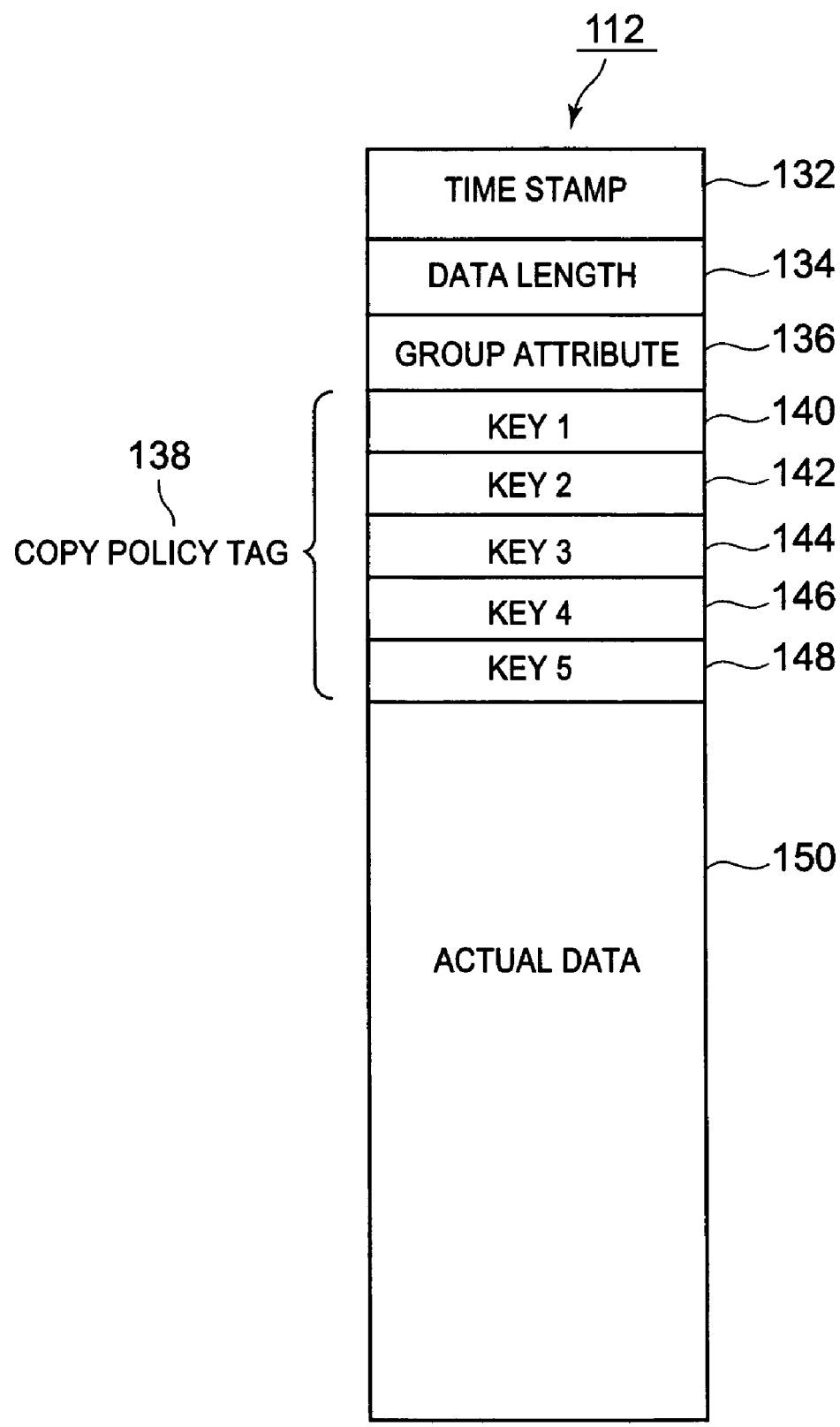
FIG. 3 is a diagram indicating an example of the structure of data with a tag.

FIG. 3 indicates an example of the structure of data with tags.

As indicated in FIG. 3, the data 112 with tags contains the actual data 150 that represents the essential content of that data, and additional information that is added to this actual data 150; and this additional information contains the time stamp 132, data length 134, group attribute 136, and copy policy tag 138. The time stamp 132 indicates the date and time that the actual data 150 was generated. The data length 134 indicates the length or amount of data of the actual data 150. The group attribute 136 indicates the identification of the data group to which the actual data 150 belongs, as well as the identification of the actual data 150 within that data group. The copy policy tags 138 have numerous differing degrees of priority, for example, the five items (called "keys" hereinafter) 140 to 148.

The above data group is a collection of a plurality of actual data 150 that has significance as a whole from the perspective of the data use objective. A typical example of a data group is a file. Preferably, the same copy policy tag is attached to all data belonging to the same data group. For that reason, the policy tagger 107 or 109 indicated in FIG. 1 or 2 receive copy policy settings from the user for every data group (for example, for every file), and can automatically attach to all of the data 150 belonging to the same data group (for example, the same file) the same copy policy tag 138 relating to the copy policy set up by the user for that data group.

Figure 4:
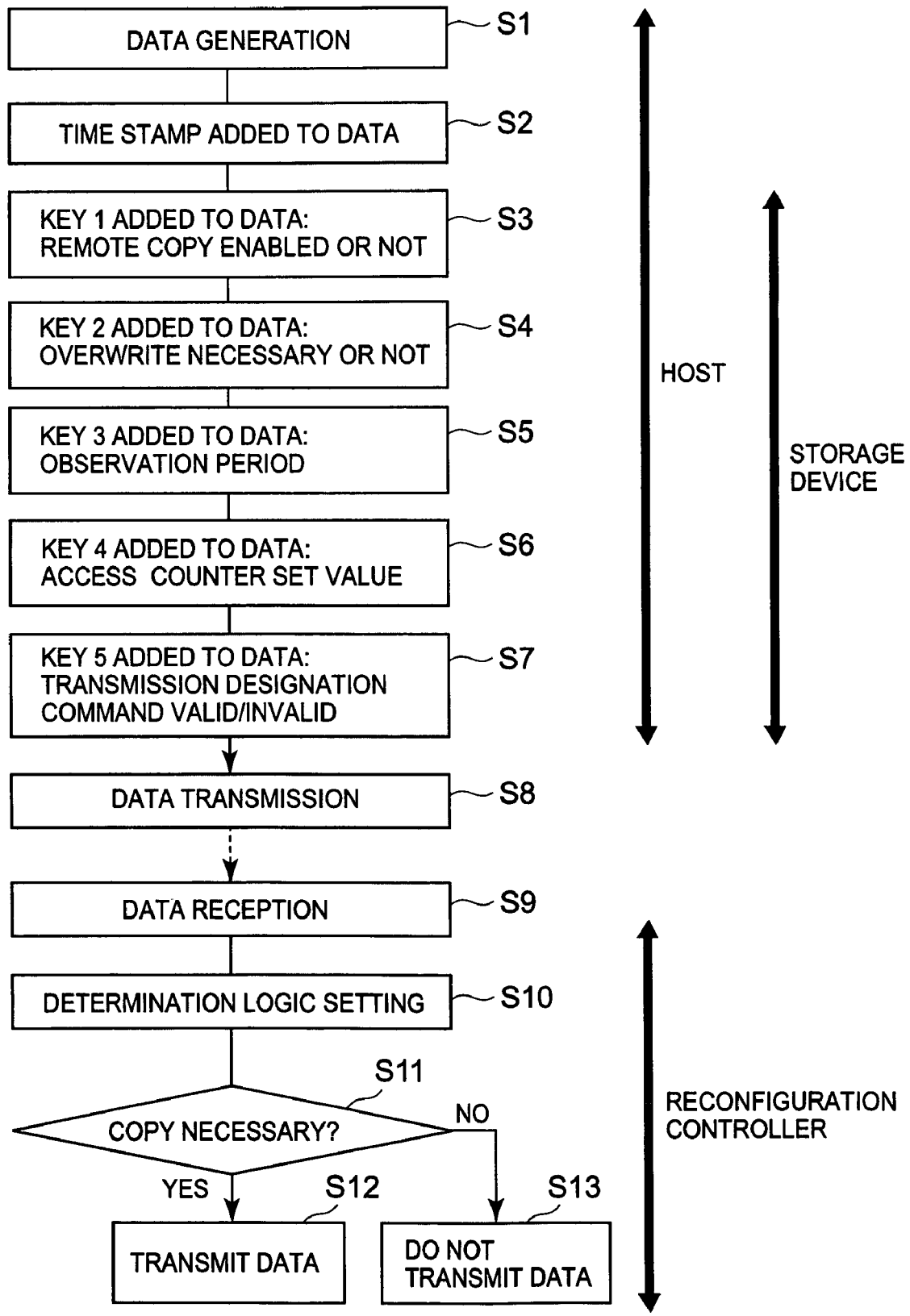
FIG. 4 is a diagram indicating the flow of a schematic representation of remote copying control of data with a tag.

FIG. 4 indicates the flow of a schematic representation of remote copying control of data with a tag.

In FIG. 4, steps S1 to S8 are conducted by the host 106. Here, the steps S3 to S7 for attaching copy policy tags may be conducted by the first storage device 100. Steps S10 to S13 are conducted by the reconfiguration controller 110.

At step S1, the host 106 generates data to be written by the first storage device 100. At step S2, a time stamp is attached to that data. At steps S3 to S6, copy policy tags, specifically, keys 1 to 5 are attached. The roles of the keys 1 to 5 are as follows.

Key 1 designates whether or not remote copying of that data is enabled. If the key 1 attached to given data designates that remote copying of that data is disabled, then the reconfiguration controller 110 does not in principle execute remote copying of that data.

Key 2 designates whether or not overwriting is enabled. If the key 2 attached to given data designates overwrite enabled, then when attempting to execute remote copying of that data, if the reconfiguration controller 110 receives update data relating to that data prior to transmitting that data to the second storage device 102, the current data is overwritten with that update data, and then the updated data is transmitted to the second storage device 102 (specifically, only the updated data, and not the current data, is transmitted to the second storage device 102). On the other hand, if the key 2 designates overwrite disabled, the reconfiguration controller 110 does not transmit the update data to the second storage device 102 until after the current data has been transmitted to the second storage device 102.

Keys 3 and 4 designate conditions for determining if remote copying is necessary. In this example, access frequency is adopted as that condition, and keys 3 and 4 designate the access frequency elements of the observation period and the access counter set value. If the key 1 attached to given data designates remote copying enabled, and if the keys 3 and 4 designate a given observation period and a given access counter set value, the reconfiguration controller 110 ascertains the data access frequency that has been executed between the nearest past (or nearest future) observation period based on an access log within the first storage device 100 or based on similar information. If the ascertained access frequency is the designated access counter set value or greater, that data is considered important data, and therefore it is determined that remote copying of that data is necessary. On the other hand, if the ascertained access frequency is less than the designated access counter set value, that data is not considered important data, and therefore it is determined that remote copying of that data is not necessary. If the key 1 attached to given data designates remote copying enabled, and if the keys 3 and 4 do not designate a significant observation period or significant access counter set value, if no significant content has been set in the keys 3 and 4, the reconfiguration controller 110 determines that remote copying of the data is necessary.

The key 5 designates whether or not a transmission designation command that the user manually inputs is valid. If the key 5 attached to given data designates that the transmission designation command is valid, and if the user has issued a transmission designation command, the reconfiguration controller 110 determines that remote copying of that data is necessary no matter what the results were when determining the necessity of remote copying based on the settings of keys 1 to 4. If other than this, the reconfiguration controller 110 operates by following the results of the remote copying necessity determination based on the settings of keys 1 to 4.

In step S8 of FIG. 4, the data with the added time stamp and keys 1 to 5 is transmitted from the host 106, and at step S9 that is data is received by the first storage device 100.

At step S10, the reconfiguration controller 110 sets up the specified determination logic for determining whether or not remote copying is necessary, and at step S11 determines the necessity of the remote copying of that data by applying to that determination logic the keys 1 to 5 attached to the received data. If determined that remote copying of that data is necessary, at step S12 the reconfiguration controller 110 transmits that data (that duplicate data) to the second storage device 102, and has that data stored in a storage region within the second storage device 102. That is, if determined that remote copying of that data is necessary, the reconfiguration controller 110 transmits the write request and the duplicate data of that data to the second storage device 102, and then the second storage device 102 stores that transmitted data at the address within the storage region in the second storage device 102 designated by the write request. On the other hand, if determined that remote copying of that data is not necessary, at step S13 the reconfiguration controller 110 does not transmit that data to the second storage device 102.

Figure 5:
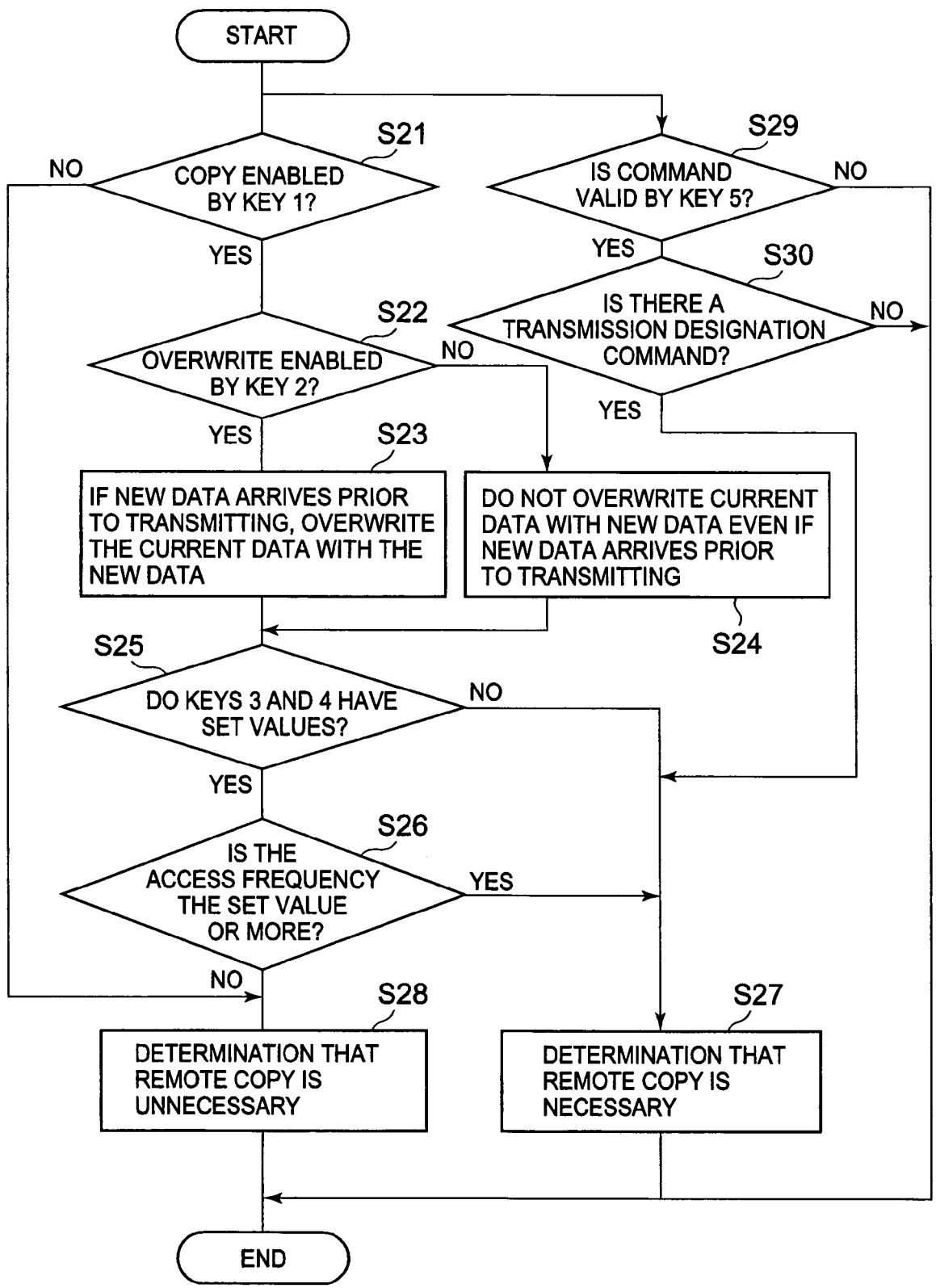
FIG. 5 indicates the flow of the determination conducted by the reconfiguration controller as to whether or not remote copying of all data is necessary.

FIG. 5 indicates the flow of the reconfiguration controller 110 to determine whether or not remote copying of all data is necessary.

The determination processing in FIG. 5 is conducted for every minimum unit ("record" hereinafter) of data transmitted for remote copying between the first storage device 100 and the second storage device 102. The concrete size of this record can vary depending on the concrete specifications of the storage devices 100 and 102. One typical example of a record is a track of a recording disk device that provides a storage region in the storage devices 100 and 102, but this is not always necessary, and, for example, a record may be a logical block or some other unit. In any event, a record is a data unit smaller than that of a data group such as a file.

The determination processing indicated in FIG. 5 is executed for every record of this kind. In this determination processing, the key 1 has the highest priority, the key 2 has the second priority, and the keys 3 and 4 have the third priority. These keys are processed in this priority order. Specifically, at step S21, key 1, which was attached to this record data is referenced, and it is determined whether or not that data is remote copy enabled.

If determined at step S21 that that data is remote copy enabled, key 2 is referenced at step S22, and it is determined whether or not that data can be overwritten. Here, if determined to be overwrite enabled, when update data to the current data is received prior to transmitting that data to the second storage device 102, at step S23 the reconfiguration controller 110 overwrites the current data with that update data, and then transmits that updated data to the second storage device 102, and omits transmission of the current data to the second storage device 102. On the other hand, if determined to be overwrite disabled, when receiving update data to the current data prior to transmitting the current data to the second storage device 102, at step S24 the reconfiguration controller 110 does not overwrite the current data with the update data, and does not transmit the update data to the second storage device 102 until the current data has been transmitted to the second storage device 102.

Subsequently, at step S25 the set values of keys 3 and 4 are referenced. If a significant observation period and significant access counter set value have been set in key 3 and key 4, at step S26 the reconfiguration controller 110 ascertains the data access frequency that has been executed between the nearest past (or nearest future) observation period based on an access log within the first storage device 100 or based on similar information, and checks whether that ascertained access frequency is the designated access counter set value or greater. If the results are that the ascertained access frequency is the designated access counter set value or greater, at step S27 it is determined that remote copying of that data is necessary. On the other hand, if the ascertained access frequency is less than the designated access counter set value, it is determined that remote copying of that data is not necessary. Moreover, if no significant observation period and significant access counter set value are set in the keys 3 and 4, then it is determined at step S27 that remote copying of the data is necessary.

Independently from the determinations based on the keys 1 to 4 above, a determination is also executed based on the key 5. Specifically, at step S29 it is determined whether or not the transmission designation command is valid by referring to the key 5. If determined that the transmission designation command is valid, at step S30 it is determined if a transmission designation command has been issued, and if the results are YES, then it is determined at step S27 that remote copying of that data is necessary.

Figure 6:
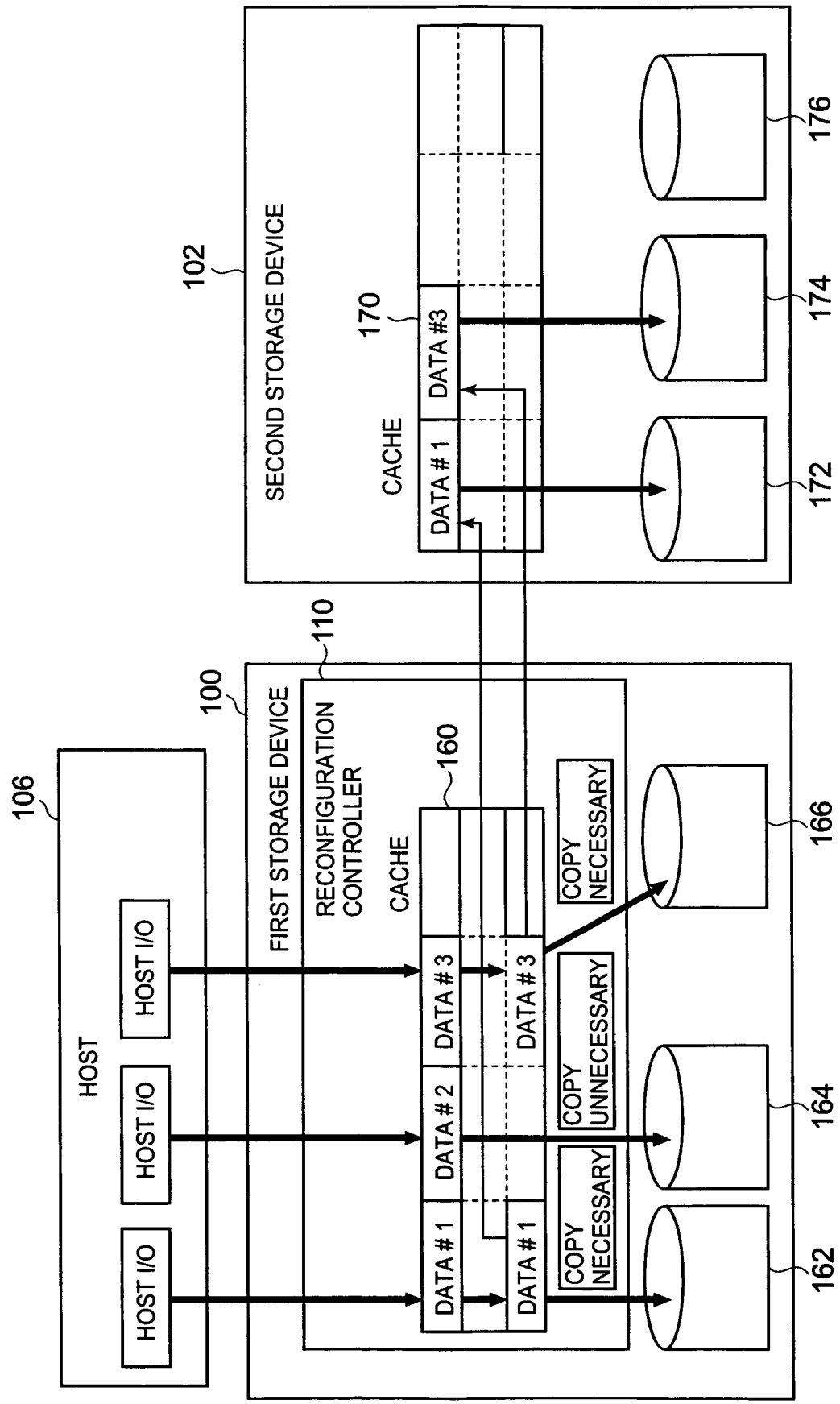
FIG. 6 is a diagram indicating the flow of data in the storage system indicated in FIG. 1.

FIG. 6 indicates the flow of data in the storage system indicated in FIG. 1.

Assume that a plurality of data No. 1, No. 2 and No. 3 are sent sequentially together with a write request from the host 106 to first storage device 100. The data No. 1, No. 2 and No. 3 that are received by the first storage device 100 are memorized in the cache region 160 in the first storage device 100. The reconfiguration controller 110 in the first storage device 100 checks the copy policy tags of the data No. 1, No. 2 and No. 3 in the cache region 160 sequentially in order of the earliest time stamp, and determines whether or not remote copying is necessary for each data No. 1, No. 2 and No. 3 based on the respective copy policy tags.

If as a result of this determination it is determined that the data No. 1 and No. 3 require remote copying, duplicates of the data No. 1 and No. 3 respectively are prepared on the cache region 160, and that duplicate data No. 1 and No. 3 are written respectively to the addresses 162 and 166 in the storage region in the first storage device 100 that was designated by the write request, and further, these data together with a write request are transmitted by the reconfiguration controller 110 to the second storage device 102. After completing the respective writing of the data No. 1 and No. 3 in the cache region 160 to the storage region in the first storage device 100, and after completing the transmission to the second storage device 102, the data is deleted from the cache region 160. On the other hand, when determined that the remote copying is unnecessary, the data No. 2 is written to the address 164 in the storage region in the first storage device 100 that was designated by the write request, but is not transmitted to the second storage device 102. In the second storage device 102, the data No. 1 and No. 3 that were transmitted together with a write request from the reconfiguration controller 110 are memorized in the cache region 170, and are subsequently written to the addresses 172 and 174 in the storage region designated by the write request. After the data No. 2 in the cache region 160 has been written to the storage region in the first storage device 100, that data is deleted from the cache region 160.

Figure 7:
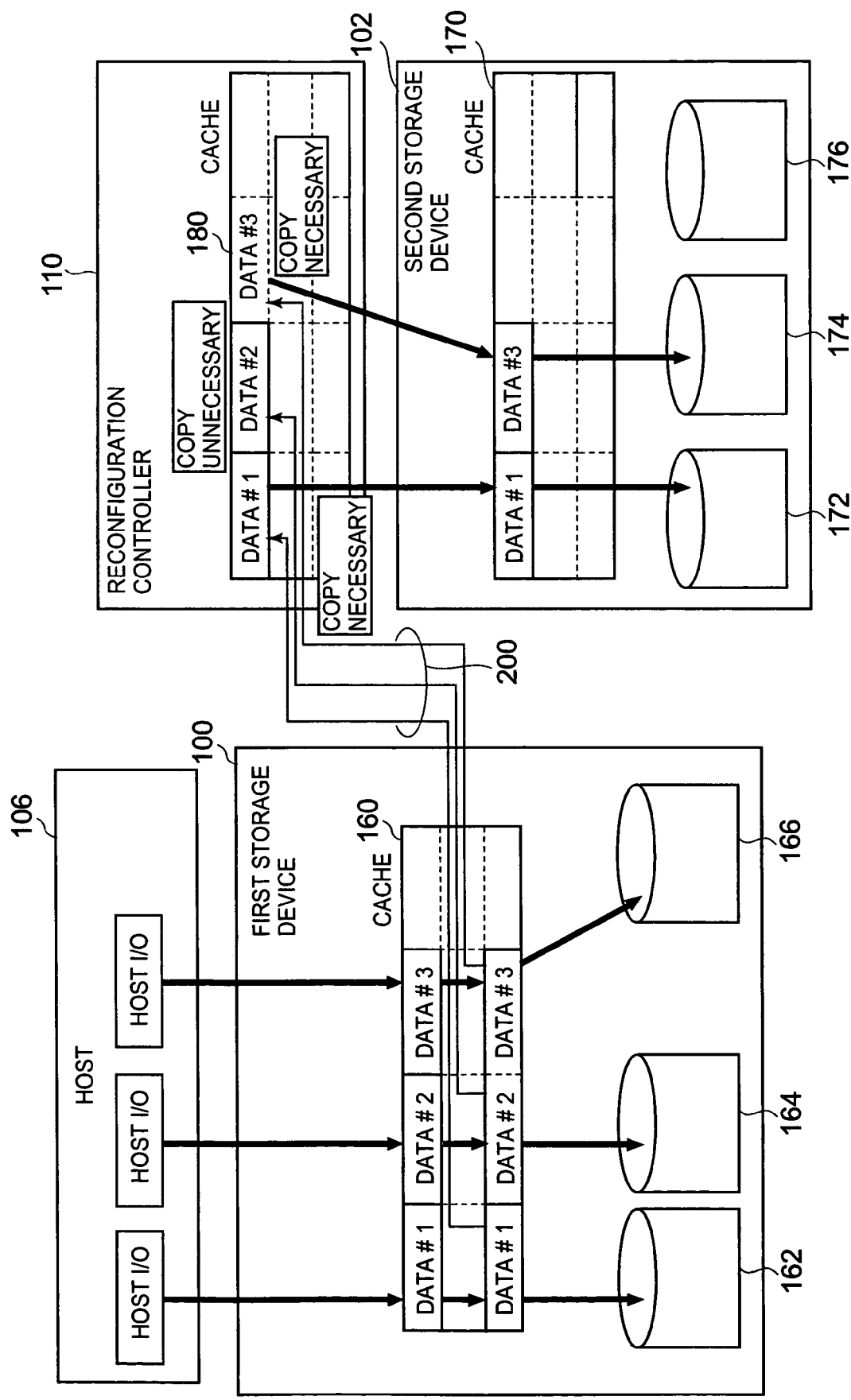
FIG. 7 is a diagram indicating the flow of data in the storage system indicated in FIG. 2.

FIG. 7 indicates the flow of data in the storage system indicated in FIG. 2.

Here, assume that a plurality of data No. 1, No. 2 and No. 3 together with a write request have been successively transmitted from the host 106 to the first storage device 100. In the same manner as with FIG. 6, the data No. 1, No. 2 and No. 3 are memorized in cache region 160 in the first storage device 100. Duplicates are respectively prepared for the data No. 1, No. 2 and No. 3 in the cache region 160, and that duplicated data No. 1, No. 2 and No. 3 are respectively written at the addresses 162, 164 and 166 in the storage region in the first storage device 100 designated by the write request, and are further transmitted to the reconfiguration controller 110. After completing the respective writing of the data No. 1, No. 2 and No. 3 in the cache region 160 to the storage region in the first storage device 100, and after completing the transmission to the reconfiguration controller 110, the data is deleted from the cache region 160.

At the reconfiguration controller 110, the data No. 1, No. 2 and No. 3 that were transmitted from the first storage device 100 are memorized in the cache region 180 in the reconfiguration controller 110. The reconfiguration controller 110 checks the copy policy tags of the data No. 1, No. 2 and No. 3 in the cache region 180 sequentially in order of the earliest time stamp, and determines whether or not remote copying is necessary for each data No. 1, No. 2 and No. 3 based on the respective copy policy tags.

If as a result it is determined that remote copying of data No. 1 and No. 3 is necessary, the reconfiguration controller 110 transmits the data No. 1 and No. 3 together with a write request to the second storage device 102. After completing the respective transmissions of the data No. 1 and No. 3 in the cache region 180 to the second storage device 102, the data is deleted from the cache region 180. On the other hand, if determined that remote copying of the data No. 2 is unnecessary, the reconfiguration controller 110 does not transmit the data No. 2 to the second storage device 102. The data No. 2 in the cache region 180 is deleted from the cache region 180 immediately after it is determined that remote copying is unnecessary. In the second storage device 102 the data No. 1 and No. 3 that were transmitted together with a write request from the reconfiguration controller 110 are memorized in the cache region 170, and are subsequently written to the addresses 172 and 174 in the storage region designated by the write request.

As described above, only the data that has been determined by the reconfiguration controller 110 to require remote copying is selected and remotely copied. Nonetheless, in the present embodiment, in addition to the method of remote copying by a route passing through the reconfiguration controller 110 as indicated above, it is also possible to utilize the method of remotely copying by transmitting data from the first storage device 100 to the second storage device 102 by a direct route that does not pass through the reconfiguration controller 110. The latter route, for example, can be utilized as a substitute for the former route when the reconfiguration controller 110 has a high load or is busy for some other reason, and a processing delay has been generated in the reconfiguration controller 110.

Figure 8:
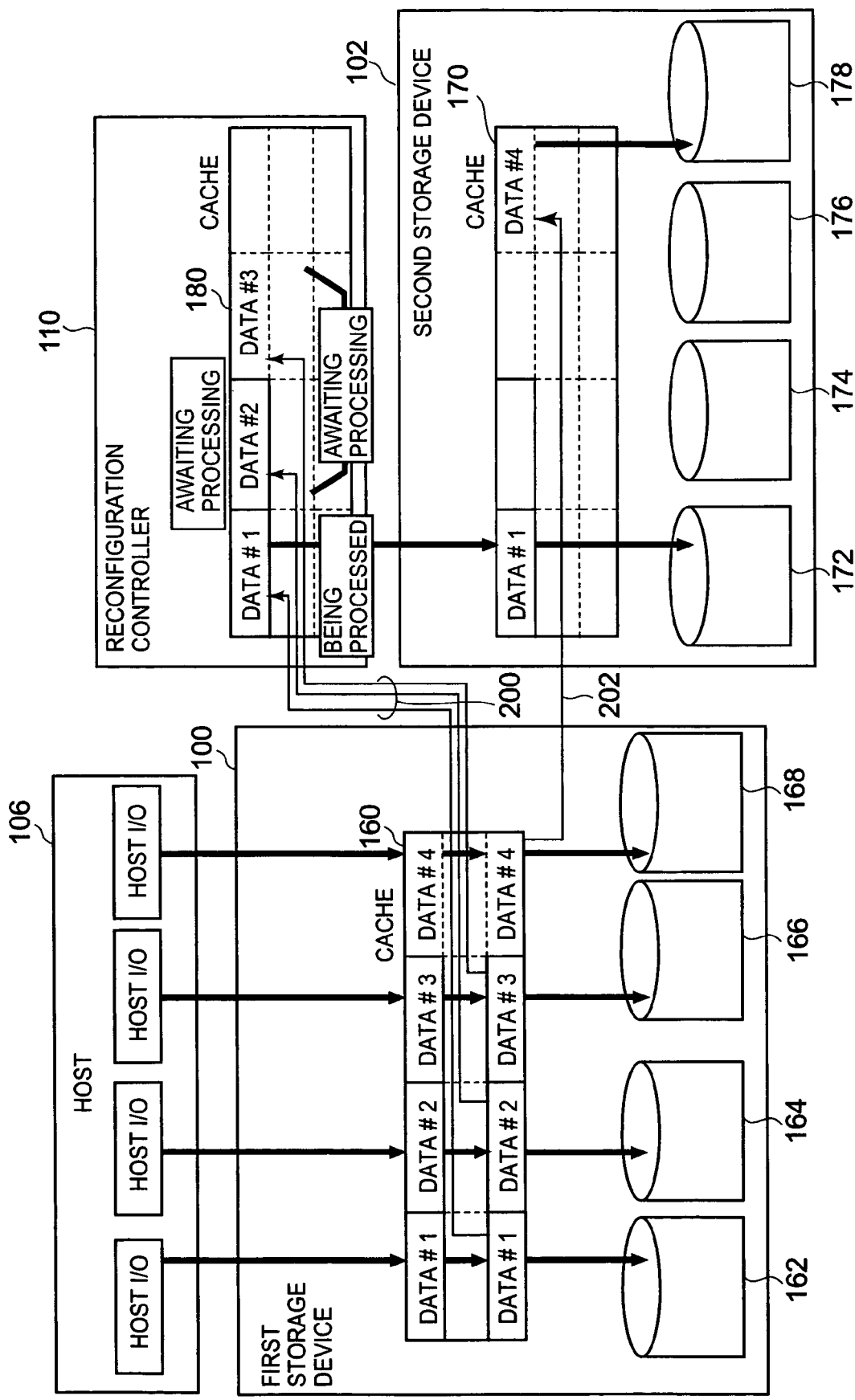
FIG. 8 is a diagram explaining the route of remote copying that passes through the reconfiguration controller, and the route of direct remote copying that does not pass through the reconfiguration controller.

FIG. 8 explains the route of remote copying that passes through the reconfiguration controller 110, and the route of direct remote copying that does not pass through the reconfiguration controller 110.

In FIG. 8, assume, after having successively sent to the reconfiguration controller 110 the data No. 1, No. 2 and No. 3 in the routes indicated by the arrows 200, that the data No. 1 is currently being processed at the reconfiguration controller 110, that the data No. 2 and No. 3 are awaiting subsequent processing, and that a busy state has occurred in which it is difficult to receive the data No. 4 that comes even later. In this case, the first storage device 100 can execute a remote copy by transmitting the subsequent data No. 4, which has not been transmitted to the reconfiguration controller 110, to the second storage device 102 by a direct route that does not pass through the reconfiguration controller 110 as indicated by the arrow 202. Further increase of the load on the reconfiguration controller 110 can thereby be avoided. The same data as the data No. 1, No. 2 and No. 3 already transmitted to the reconfiguration controller 110 is not transmitted by the direct route 202.

Figure 9:
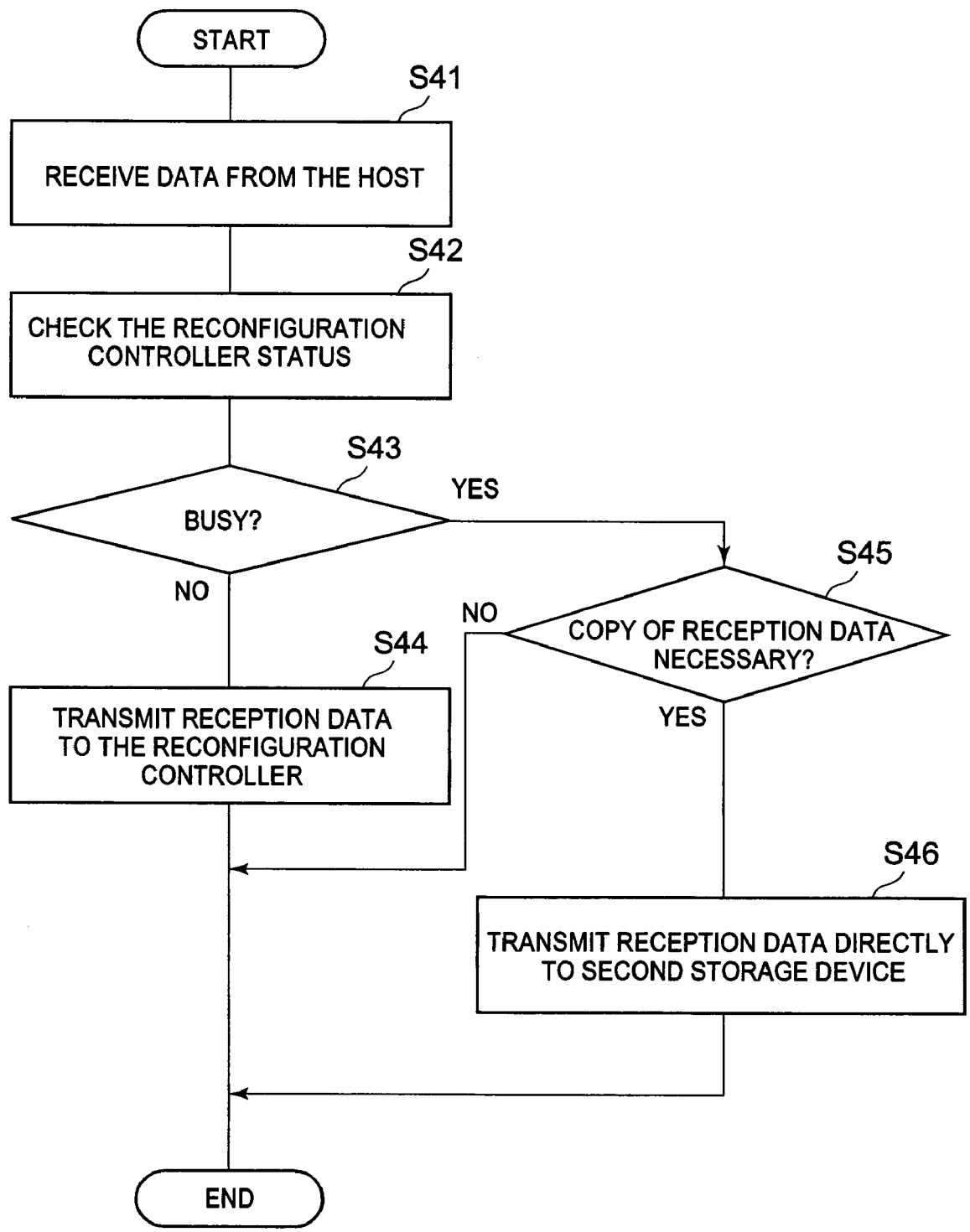
FIG. 9 is a diagram indicating the flow of control conducted by the first storage device 100 in order to select the two routes indicated in FIG. 8.

FIG. 9 indicates the flow of control conducted by the first storage device 100 in order to select the two transmission routes described above.

In FIG. 9, at step S41, write request data is received from host 106 by the first storage device 100. At step S42, the first storage device 100 communicates with the reconfiguration controller 110 to check the status of the reconfiguration controller 110. If as a result of that check, the status of the reconfiguration controller 110 is normal ("NO" at step S43), at step S44 the first storage device 100 transmits the reception data to the reconfiguration controller 110.

On the other hand, if as a result of the check at step S42 the reconfiguration controller 110 is in the busy state ("YES" at step S43), at step S45 the first storage device 100 determines whether or not remote copying of that reception data is necessary. This determination uses the same logic as the determination logic that the reconfiguration controller 110 executes, and can be executed based on the copy policy tags attached to the reception data. If the result of that determination determines that remote copying is necessary, ("YES" at step S45), at step S46 the first storage device 100 transmits the reception data to the second storage device 102 by the direct route 202. On the other hand, if the determination results at step S45 determined that remote copying is unnecessary, that reception data is not transmitted. By repeating the control in FIG. 9, the route passing through the reconfiguration controller 110 can be selected again after the reconfiguration controller 110 has returned from the busy state to the normal.

In this regard, the step S45 described above may be omitted. Specifically, if the reconfiguration controller 110 is in the busy state ("YES" at step S43), the control may advance to the step S46.

As already described, the policy tagger 107 or 109 indicated in FIG. 1 or FIG. 2 can automatically attach to all the data belonging to the same data group (for example, the same file) the same policy tag reflecting the copy policy that the user sets for that data group. However, there is still a risk of problems occurring by attaching different copy policy tags to differing data belonging to the same data group (for example, the same file). To resolve this problem, in this embodiment, in the final determination of whether or not remote copying of data is necessary, the reconfiguration controller 110 has a logic that poses different determination results than the determination results based on the copy policy tags attached to the data as described above.

Figure 10:
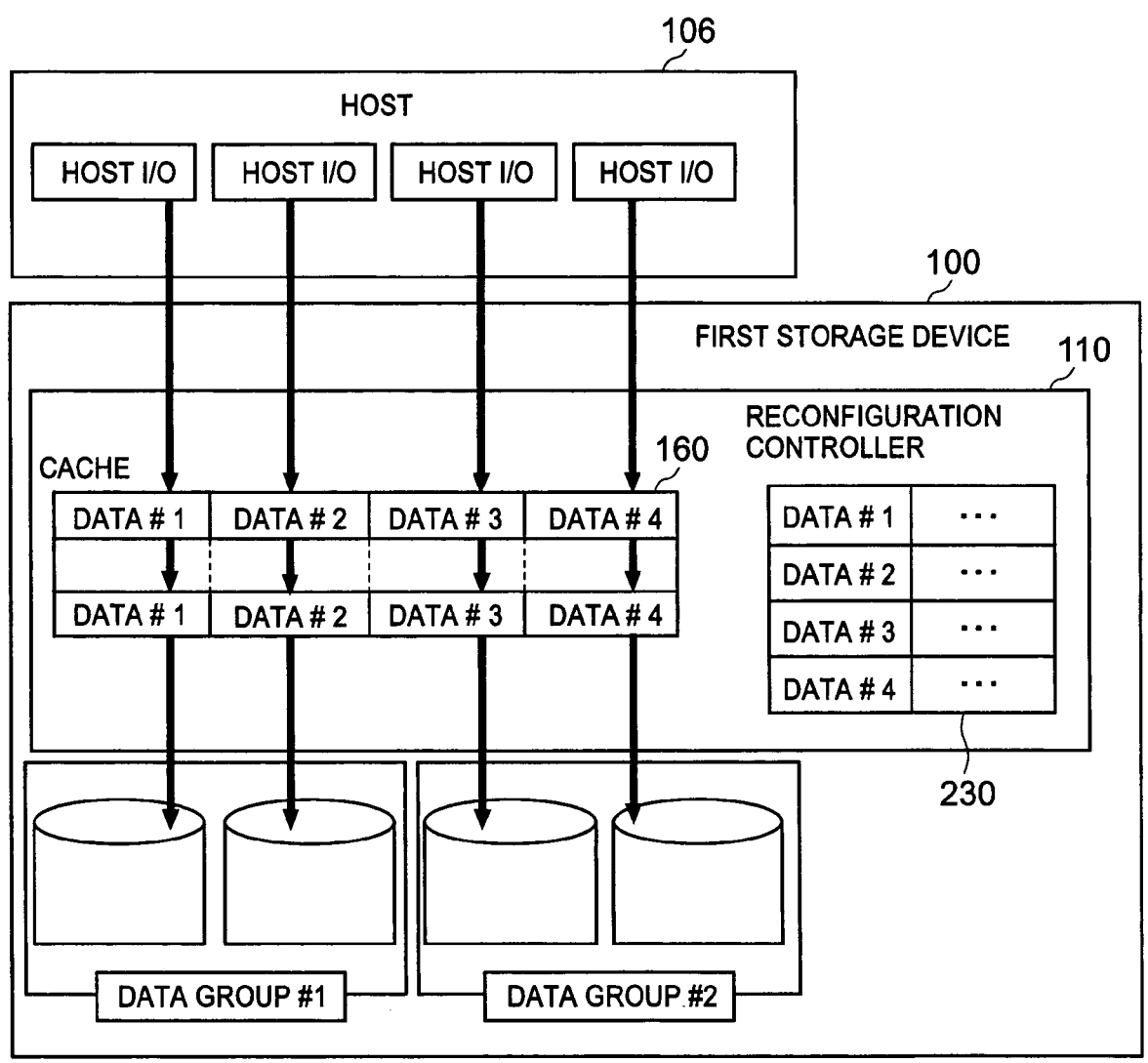
FIG. 10 is a diagram indicating the configuration of the reconfiguration controller 110 for resolving inconsistencies of policy tags between data in the same data group.

FIG. 10 indicates the configuration of the reconfiguration controller 110 for resolving inconsistencies of policy tags between data in the same data group.

As indicated in FIG. 10, the reconfiguration controller 110 has a remote copy control table 230, and registered in this remote copy control table 230 are a plurality of information items (called "remote copy control items" hereinafter) necessary for the remote copy control of data for every record (for example, track). The reconfiguration controller 110 refers to the remote copy control table 230 and searches for inconsistencies in the copy policy tags between records in the same data group (for example, in the same file), and if inconsistencies in copy policy tags are found, irrespective of the contents of the copy policy tags of these data, the necessity or not for remote copying of these records is forcibly controlled to be the same (typically, remote copying is made unnecessary). In the example indicated in FIG. 10, the same copy policy tag should be attached to both the data No. 1 and No. 2 of the differing records belonging to a given same data group No. 1, and the same copy policy tag should be attached to both the data No. 3 and No. 4 of differing records belonging to a separate same data group No. 2. If, for example, the copy policy tags of the data No. 1 and No. 2 differ, the reconfiguration controller 110 forcibly controls both the data No. 1 and No. 2 to have the same necessity or not of remote copying (typically, remote copying is made unnecessary). In this regard, FIG. 10 indicates a system in which the reconfiguration controller 110 is built into the first storage device 100, but the configuration and operation of the reconfiguration controller 110 for resolving the aforementioned problem are the same even in a system with reconfiguration controller 110 outside the first storage device 100 as indicated in FIG. 2.

FIG. 11 indicates a concrete example of a remote copying control table.

In the example of FIG. 11, the remote copy control items of data No. 1, No. 2, No. 3 and No. 4 of a plurality of records received from the host 106 are registered in the remote copy control table 230. The remote copy control items of every record registered in the remote copy control table 230 comprise, for example, a record identification (for example, track identification), time stamp, data identification, data group identification, and copy policy tag (specifically, key 1, key 2, key 3, key 4, and key 5). Further, the determination results of whether or not remote copying is necessary for the data of every record is also registered in the remote copy control table 230. The reconfiguration controller 110 refers to the remote copy control table 230 like the example indicated in FIG. 11, and compares the copy policy tags (key 1, key 2, key 3, key 4, and key 5) between the differing records (data) having the same data group identification. If a mismatch is found in the copy policy tags as a result of this comparison, irrespective of the content of the copy policy tags, the determination results of the necessity or not for remote copying of these data are forcibly set to be the same, for example, "remote copying unnecessary". In the example indicated in FIG. 11, there is a mismatch of copy policy tags (mismatch of key 1 and key 3) between differing data No. 1 and No. 2 belonging to the same data group No. 1, and therefore, the determination results of the necessity or not of remote copying of data No. 1 and No. 2 is forcibly set to "remote copying unnecessary". On the other hand, the copy policy tags agree between differing data No. 3 and No. 4 belonging to separate same data group No. 2, and therefore, the determination results of whether or not remote copying of data No. 3 and No. 4 is necessary are set to the results determined based on that same copy policy tag.

Figure 12:
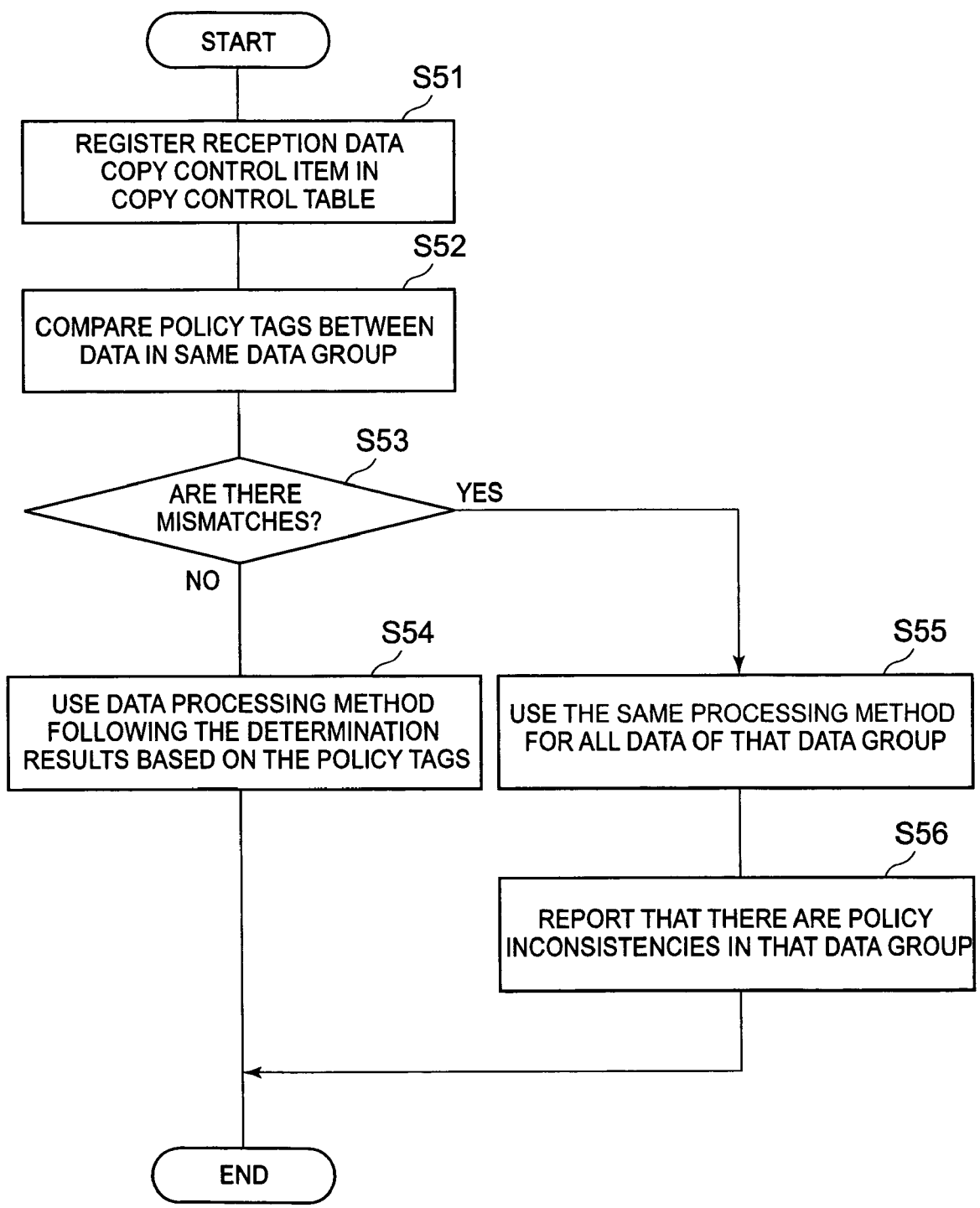
FIG. 12 indicates the flow of control that the reconfiguration controller conducts in order to resolve inconsistencies of copy policy tags.

FIG. 12 indicates the flow of control that the reconfiguration controller 110 conducts in order to resolve inconsistencies of copy policy tags.

In FIG. 12, at step S51, every time data to be written is received, the reconfiguration controller 110 registers the remote copy control items of the received data in the remote copy control table 230. At step S52, the reconfiguration controller 110 refers to the remote copy control table 230, and searches for mismatches by comparing the copy policy tags between the data belonging to the same data group. If no mismatches are found in the results ("YES" at step S53), at step S54 the reconfiguration controller 110 selects processing that transmits or does not transmit to the second storage device 102 the data registered in the remote copy control table 230 following the determination results of whether or not remote copying is necessary based on the copy policy tags thereof.

If copy policy tag mismatches were found between data belonging to the same data group ("NO" at step S53), at step S55, the reconfiguration controller 110 uses the same determination result for the necessity or not of remote copying for all of that data group registered in the remote copy control table 230. "Remote copying unnecessary", for example, can be adopted as this same determination result, but "remote copying necessary" may be adopted instead, or, determination results based on the copy policy tags of the old time stamped data in the data belonging to that data group in the remote copy control table 230 may be adopted. At step S56, the reconfiguration controller 110 reports to the host 106 that there were copy policy tag mismatches in that data group.

Embodiments of the present invention were explained above, but these embodiments were nothing more than examples to explain the present invention. The present invention can be implemented in a variety of forms other than the embodiments described above as long as they do not deviate from the scope thereof.

What is claimed is:

1. A storage system, comprising:
   a first storage device that receives and stores at least one data set from a host;

a second storage device that receives and stores the at least one data set transmitted from the first storage device, and in which remote copying of the data set stored in the first storage device to the second storage device can be executed, wherein each data set stored in the first storage device has a copy policy tag that defines a policy relating to the remote copying of the data set;

a reconfiguration controller that selects whether or not to transmit the data set stored in the first storage device to the second storage device based on the copy policy tag of the each data set stored in the first storage device, wherein the copy policy tag of the each data set comprises an element that designates conditions for requiring remote copying of the data set, the reconfiguration controller determining whether or not the data set fulfills the conditions designated by the copy policy tag, and selectively transmitting to the second storage device the data set that fulfills the conditions, and wherein the conditions comprise an access counter set value, the reconfiguration controller detecting the access frequency of the each data set, and determining whether or not the conditions are fulfilled by comparing the detected access frequency with the set value designated by the copy policy tag of the data set.

2. The storage system according to claim 1, wherein the reconfiguration controller is built into the first storage device.

3. The storage system according to claim 1, wherein the reconfiguration controller is located outside of the first storage device and the second storage device, receives each data set stored in the first storage device from the first storage device, and selects whether or not to transmit the data set received from the first storage device to the second storage device based on the copy policy tag of the data set received from the first storage device.

4. The storage system according to claim 1, wherein the copy policy tag of the each data set comprises an element that designates whether or not remote copying of the data set is enabled, and the reconfiguration controller selectively transmits to the second storage device the data set having the copy policy tag that designates remote copy enabled.

5. The storage system according to claim 1, wherein the copy policy tag of the each data set comprises an element that designates whether or not the data set can be overwritten, and (A) when attempting to transmit to the second storage device current data having the copy policy tag designating overwrite enabled, and if update data to the current data is received prior to transmitting the current data to the second storage device, the reconfiguration controller transmits the update data to the second storage device without transmitting the current data to the second storage device, and (B) when attempting to transmit to the second storage device current data having the copy policy tag designating overwrite disabled, and if update data to the current data is received prior to transmitting the current data to the second storage device, the reconfiguration controller transmits the update data to the second storage device after the current data is transmitted to the second storage device.

6. The storage system according to claim 1, wherein the copy policy tag of the each data set comprises an element designating whether or not a transmission designation command input from a user is valid, and if the transmission designation command from the user is input, the reconfiguration controller selectively transmits to the second storage device the data set having the copy policy tag that designates that the transmission designation command is valid.

7. The storage system according to claim 1, wherein the first storage device checks whether or not the reconfiguration controller is in the busy state, and if the reconfiguration controller is in the busy state, the first storage device transmits, among the data sets stored in the first storage device, the data set not yet handled by the reconfiguration controller directly to the second storage device without passing through the reconfiguration controller.

8. The storage system according to claim 1, wherein the reconfiguration controller checks whether or not there are mismatches of the copy policy tags between a plurality of data sets belonging to the same data group within the data sets stored in the first storage device, and if mismatches of the copy policy tags are detected, the same processing relating to whether or not to transmit to the second storage device is applied to all of the plurality of data sets belonging to the same data group.

9. The storage system according to claim 1, further comprising a policy tagger that attaches the copy policy tag to the each data set stored in the first storage device.

10. The storage system according to claim 9, wherein the policy tagger is provided in the host.

11. The storage system according to claim 9, wherein the policy tagger is provided in the first storage device.

12. The storage system according to claim 9, wherein the policy tagger attaches the copy policy tag of the same content to all of the plurality of data sets belonging to the same data group.

13. A controller in a storage system comprising first and second storage devices, which controls remote copying of data sets stored in the first storage device to the second storage device, wherein each data set stored in the first storage device has a copy policy tag that defines the policy relating to the remote copying of the data set, the copy policy tag of the each data set comprising an element that designates conditions for requiring remote copying of the data set, and the conditions comprising an access counter set value, the controller selects whether or not to transmit the data set stored in the first storage device to the second storage device based on the copy policy tag of the data set stored in the first storage device, the controller determines whether or not the data set fulfills the conditions designated by the copy policy tag, and selectively transmits to the second storage device the data set that fulfills the conditions, and the controller detects the access frequency of the each data set, and determines whether or not the conditions are fulfilled by comparing the detected access frequency with the set value designated by the copy policy tag of the data set.

14. A method for controlling remote copying of data sets stored in a first storage device to a second storage device in a storage system comprising the first and second storage devices, the method comprising the steps of:

attaching to the each data set stored in the first storage device a copy policy tag that defines the policy relating to remote copying of the data set, the copy policy tag of the each data set comprising an element that designates conditions for requiring remote copying of the data set, and the conditions comprising an access counter set value;

selecting whether or not to transmit the data set stored in the first storage device to the second storage device based on the copy policy tag of the data set stored in the first storage device;

determining whether or not the data set fulfills the conditions designated by the copy policy tag, and selectively transmitting to the second storage device the data set that fulfills the conditions; and detecting the access frequency of the each data set and determining whether or not the conditions are fulfilled by comparing the detected access frequency with the set value designated by the copy policy tag of the data set.

* * * * *